United States Patent [19]
Fukui et al.

[11] Patent Number: 5,632,246
[45] Date of Patent: May 27, 1997

[54] CONTROL APPARATUS FOR INTERNAL COMBUSTION ENGINE

[75] Inventors: Wataru Fukui; Yasukazu Koezuka, both of Tokyo, Japan

[73] Assignee: Mitsubishi Denki Kabushiki Kaisha, Tokyo, Japan

[21] Appl. No.: 602,354

[22] Filed: Feb. 16, 1996

[30] Foreign Application Priority Data

Apr. 17, 1995 [JP] Japan ................................. 9-090791

[51] Int. Cl.$^6$ ...................... F02P 7/067; F02P 11/00
[52] U.S. Cl. ................ 123/414; 123/617; 123/630
[58] Field of Search ........................ 123/414, 612, 123/613, 617, 630, 643; 73/117.3, 118.1

[56] References Cited

U.S. PATENT DOCUMENTS

| | | | |
|---|---|---|---|
| 4,615,318 | 10/1986 | Imoto et al. | 123/414 |
| 4,766,865 | 8/1988 | Hartel | 123/414 |
| 5,074,275 | 12/1991 | Fukui | 123/613 |
| 5,245,968 | 9/1993 | Kolias et al. | 123/414 |
| 5,329,904 | 7/1994 | Kokubo et al. | 123/414 |
| 5,333,586 | 8/1994 | Fukui | 123/414 |
| 5,345,909 | 9/1994 | Fukui et al. | 123/414 |
| 5,469,823 | 11/1995 | Ott et al. | 123/414 |
| 5,494,017 | 2/1996 | Miyata et al. | 123/414 |
| 5,572,973 | 11/1996 | Schenk | 123/414 |

FOREIGN PATENT DOCUMENTS

3-168346  7/1991  Japan .

*Primary Examiner*—Willis R. Wolfe
*Attorney, Agent, or Firm*—Sughrue, Mion, Zinn, Macpeak & Seas

[57] ABSTRACT

A control apparatus for an internal combustion engine which is capable of performing engine cylinder identification rapidly, easily and inexpensively, while capable of performing a backup control upon occurrence of abnormality in a first signal series containing an angular position signal. The control apparatus includes a first signal detector for generating a first signal series in synchronism with a rotating shaft of the engine, a second signal detector for generating a second signal series in synchronism with the rotating shaft and a control means for controlling parameter on the basis of the first and second signal series. The first signal series includes an angular position signal and a constant level signal corresponding to a reference position for a specific cylinder group. The second signal series includes cylinder identifying signal having a pulse for a given one of the cylinders which differs from those for the other cylinders and a pulse edge falling within the duration of the constant level signal. The control means includes a means for detecting the reference positions for the individual cylinders on the basis of the pulse edge of the cylinder identifying signal and the angular position signal, a means for identifying the cylinders on the basis of the second signal series, a means for arithmetically determining control timings for controlling the parameter on the basis of the results of the cylinder identification and the second signal series, and an abnormality decision means for deciding a fault of the signal series.

13 Claims, 7 Drawing Sheets

CONTROL APPARATUS FOR INTERNAL COMBUSTION ENGINE

BACKGROUND OF THE INVENTION

1. Field of the Invention

The present invention generally relates to a control apparatus for an internal combustion engine for effecting a timing control by identifying reference positions corresponding to individual engine cylinders, respectively. More particularly, the invention is concerned with an engine control apparatus which can rapidly perform cylinder identification to be reflected onto the timing control with a simplified structure and which apparatus is capable of executing a backup control even when a failure occurs in a first signal series containing an angular position signal indicating an angular position of a crank shaft.

2. Description of Related Art

In general, in a control system for an internal combustion engine (hereinafter also referred to simply as the engine), a reference position signal and a cylinder identifying signal generated in synchronism with rotation of the engine are utilized for the purpose of controlling ignition timing, amount or quantity of fuel to be injected (hereinafter also referred to as the fuel injection quantity) and others. Usually, the signal generator for generating these signals is mounted on a cam shaft of the engine and structured such that one-to-one correspondence to the engine cylinders can be established for thereby detecting indirectly rotation or angular positions of a crank shaft.

Figure 8:
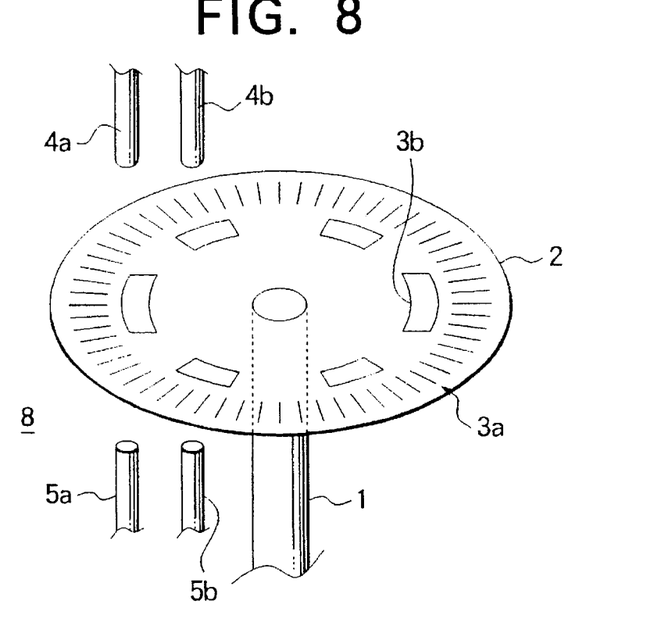
FIG. 8 is a perspective view showing a mechanical structure of a rotation signal generator employed in a hitherto known engine control apparatus.
Figure 9:
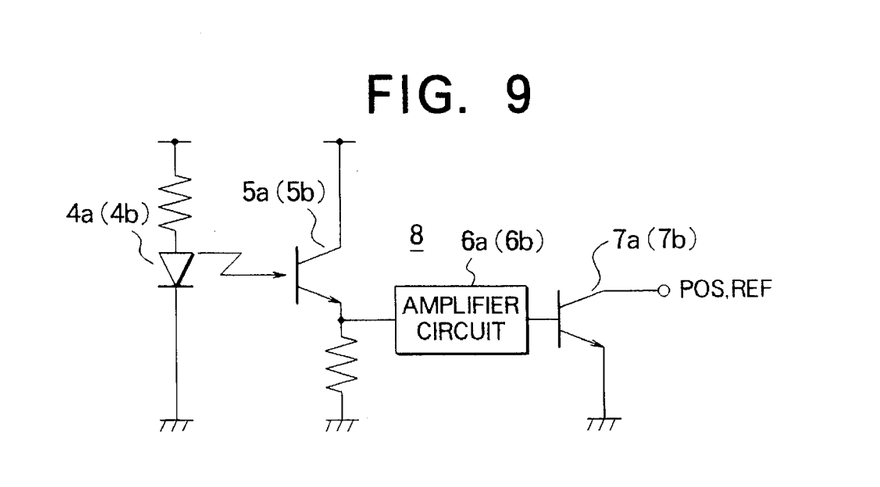
FIG. 9 is a circuit diagram showing an electric signal processing circuit of the rotation signal generator employed in the hitherto known engine control apparatus.

For having better understanding of the present invention, technical background thereof will be descried in some detail. FIG. 8 is a perspective view showing a mechanical structure of a rotation signal generator employed in a hitherto known engine control system, and FIG. 9 is a circuit diagram showing an electric signal processing circuit provided in association with the assembly shown in FIG. 8. Such rotation signal generator is described in Japanese Unexamined Patent Application Publication No. 68252/1994 (JP-A-6-68252) on the assumption that the internal combustion engine of concern has six cylinders.

Referring to FIG. 8, a cam shaft 1 is rotated at a speed equal to a half of the rotation speed (rpm) of a crank shaft (not shown) so that the control timings for all the six cylinders can be covered by a single rotation of the cam shaft 1.

More specifically, a rotating disk 2 fixedly secured to the cam shaft 1 so as to corotate therewith is formed with a series of radial slits 3a in an outer peripheral portion of the rotating disk 2 with equal angular distance therebetween for generating an angular position signal POS formed by a series of pulses which are generated at every predetermined angle in the course of rotation of the rotating disk 2. Additionally, the rotating disk 2 is formed with a predetermined number of windows 3b (six windows in this case) for generating reference position signals REF in one-to-one correspondence to the engine cylinders, respectively.

A light emission diode (LED) 4a is disposed fixedly at a position facing a circular array of the slits 3a, while another light emission diode (LED) 4b is fixedly disposed at a position facing a circular array of the windows 3b. Further, photodiodes 5a and 5b are fixedly disposed in opposition to the light emission diodes 4a and 4b, respectively, with the rotating disk 2 being interposed therebetween, wherein the light emission diodes 4a; 4b and the photodiode 5a; 5b cooperate to constitute first and second photocouplers, respectively.

Referring to FIG. 9, amplifier circuits 6a and 6b are connected to output terminals of the photodiodes 5a and 5b, respectively, while connected to the output terminals of the amplifier circuits 6a and 6b are output transistors 7a and 7b, respectively.

As can be appreciated from the above, the rotating disk 2, the photocouplers 4a; 5a and 4b; 5b, the amplifier circuits 6a and 6b and the output transistors 7a and 7b constitute a rotation signal generator 8 for generating the angular position signal POS and the reference position signal REF.

Figure 10:
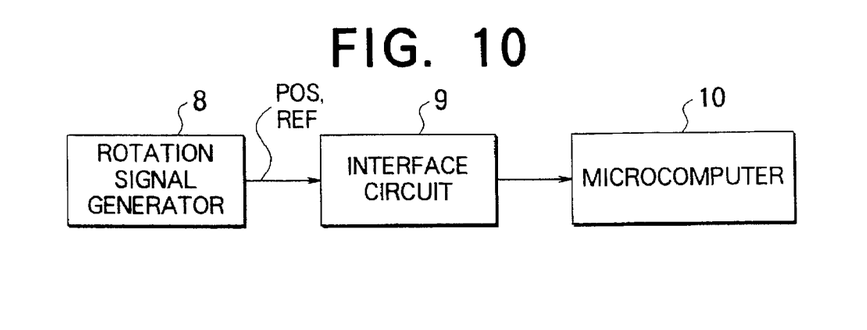
FIG. 10 is a block diagram showing a structure of the engine control apparatus known heretofore.

FIG. 10 is a block diagram showing an engine control system known heretofore. Referring to the Figure, the angular position signal POS and the reference position signal REF outputted from the rotation signal generator 8 are supplied to a microcomputer 10 by way of an interface circuit 9 to be processed for controlling the ignition timing, the fuel injection quantity and others.

Figure 11:
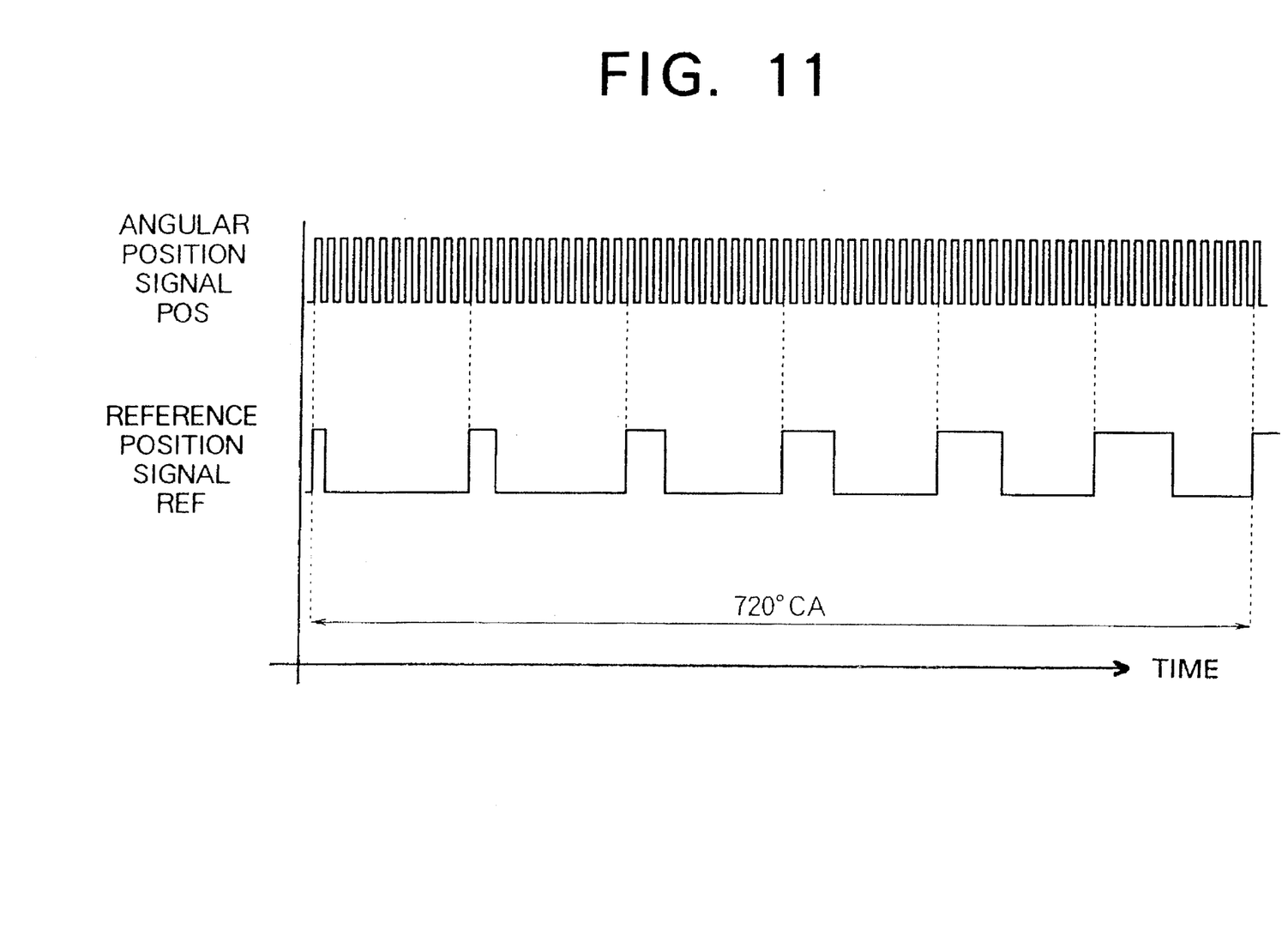
FIG. 11 is a waveform diagram for illustrating operation of the hitherto known engine control apparatus.

FIG. 11 is a waveform diagram for illustrating the angular position signal POS and the reference position signal REF outputted from the rotation signal generator 8.

Referring to the Figure, the angular position signal POS is comprised of a series of pulses generated in correspondence to the slits 3a, respectively, formed in the rotating disk 2, wherein each of the pulses of the angular position signal POS is generated, for example, at every crank angle of 1°. Thus, the angular position signal POS can be used for determining the angular position of the crank shaft. On the other hand, the reference position signal REF has a pulse sequence repeated upon every rotation of the crank shaft over every crank angle of 720°. More specifically, the pulse sequence of the reference position signal REF includes six pulses each rising up at a predetermined angle in correspondence to each of the engine cylinders, wherein the six pulses have respective pulse widths which differ from one to another engine cylinder so that they can be used as the cylinder identifying signals, respectively.

The conventional engine control system implemented in such structure as described above by reference to FIGS. 8 to 10 can discriminatively identify the individual engine cylinders and the reference positions (reference crank angles) on the basis of the angular position signal POS and the reference position signal REF for effectuating optimal control of the ignition timing, the fuel injection quantity and others in dependence on the engine operation states.

However, the conventional rotation signal generator 8 is disadvantageous in that because of necessity of disposing the photocouplers 4a; 5a and 4b; 5b close to each other, the space for installing the rotation signal generator 8 is restricted with the freedom in design being impaired.

As an approach for solving the above problem mentioned above, there has already been proposed such an apparatus which is so implemented as to generate the angular position signal POS and the reference position signal REF with high accuracy in association with the crank shaft while generating only the cylinder identifying signals bearing one-to-one correspondence to the individual engine cylinders, respectively, in association with the cam shaft 1, as is disclosed, for example, in Japanese Unexamined Patent Application Publication No. 68252/1994 (JP-A-6-68252).

However, the engine control system disclosed in the above publication suffers shortcomings in that the sensor as well as peripheral devices thereof provided in association with the crank shaft for generating the angular position signal POS and the reference position signal REF is much complicated and expensive and that a great difficulty is encountered in realizing a backup control in the case where either one of the angular position signal POS or the reference position signal REF becomes unavailable due to occurrence of abnormality or fault in the sensors provided in association with the crank shaft, leading possibly to shutdown of the engine operation.

As is apparent from the foregoing, the engine control system known heretofore suffers a problem that the freedom of design is impaired when the rotation signal generator 8 is provided in association with the cam shaft 1, giving rise to a problem that it can not be manufactured at low cost.

On the other hand, in the case of the engine control system such as proposed in Japanese Unexamined Patent Application Publication No. 68252/1994 (JP-A-6-68252) where the angular position signal POS and the reference position signal REF are generated by the sensor device provided in association with the crank shaft, while the cylinder identifying signal is generated by the means provided in association with the cam shaft, there arises problems that the sensor and peripheral devices provided in association with the crank shaft are much complicated and that the backup control can not be carried in the case where the angular position signal POS or the reference position signal REF becomes unavailable.

SUMMARY OF THE INVENTION

In the light of the state of the art described above, it is an object of the present invention to provide an engine control apparatus which is capable of performing rapidly engine cylinder identification which is to be reflected to the timing control of the engine with a relatively simplified structure.

Another object of the present invention is to provide an engine control apparatus which is capable of performing a backup control even in the case where a first series signal including the angular position signal is not available.

In view of the above and other objects which will become apparent as the description proceeds, there is provided according to a general aspect of the present invention an apparatus for controlling an internal combustion engine, which apparatus includes a first signal detector for generating a first signal series in synchronism with rotation of a rotating shaft of the internal combustion engine, a second signal detector for generating a second signal series in synchronism with rotation of the rotating shaft, and a control means for controlling a parameter involved in operation of the internal combustion engine on the basis of the first and second signal series. The first signal series includes an angular position signal generated at every predetermined angular position of the rotating shaft and a constant level signal generated over a predetermined angular range and indicating a reference position corresponding to at least a specific cylinder group of the engine. The second signal series is formed by pulses corresponding to the cylinders, respectively, and contains a cylinder identifying signal for a given one of the cylinders, wherein a pulse form of the cylinder identifying signal for the given one cylinder differs from those for the other engine cylinders. The cylinder identifying signal has a pulse edge generated at a time point falling within an interval of the constant level signal. The control means includes a reference position detecting means for detecting the reference position on the basis of the angular position signal contained in the first signal series and generated in succession to a pulse edge contained in the second signal series, a cylinder group identifying means for identifying the cylinder group on the basis of the constant level signal and the second signal series, a cylinder identifying means for discriminatively identifying each of the engine cylinders on the basis of at least the second signal series, a control timing arithmetic means for arithmetically determining control timings for controlling the parameter on the basis of at least the results of the cylinder identification performed by the cylinder identifying means and the second signal series, and an abnormality decision means for generating and supplying an abnormality decision signal to the cylinder identifying means and the control timing arithmetic means upon detection of a fault in the first signal series.

By providing the first detector for detecting the first signal series (i.e., angular position signal containing the constant level signal indicating a reference position for at least a specific cylinder group) in association with the rotating shaft of the engine, while providing the second detector for detecting the second signal series generated in synchronism with the rotation of the rotating shaft, wherein the timing for the pulse edge of the cylinder identifying signal falls within the duration or interval of the constant level signal, the cylinder identification can easily and reliably be realized without incurring inexpesiveness. Besides, by combination of the angular position signal containing the reference position and the cylinder identifying signal, the cylinder identification which is to be reflected onto the timing control of the internal combustion engine can be carried out rapidly. Moreover, even in the case where the first or second signal series can not be obtained, the backup control for the internal combustion engine can be ensured by using only the second or first signal series.

In a preferred mode for carrying out the invention, the first signal series may be generated in synchronism with a crank shaft of the internal combustion engine, while the second signal series may be generated in synchronism with a cam shaft driven with a speed reduction ratio of "½" relative to the crank shaft.

Owing to the arrangement described above, the first signal series containing the constant level signal and the angular position signal cane generated in synchronism with rotation of the crank shaft, whereby the internal combustion engine can be controlled with higher accuracy. Besides, by generating the second signal series containing the cylinder identifying signal in synchronism with rotation of the cam shaft, not only the given one cylinder but also the other cylinders can be identified with high reliability.

In another preferred mode for carrying out the invention, the control timing arithmetic means may be so arranged as to arithmetically determine the control timings for the parameter or parameters by counting pulses of the angular position signal.

By virtue of the arrangement mentioned above, the control timing can arithmetically be determined with high accuracy by counting the angular position signal pulses.

In yet another preferred mode for carrying out the invention, the reference position signal may be formed by a signal which corresponds to a low level interval of the first signal series during which the angular position signal is not generated continuously. In that case, a terminal end of the low level interval or the reference position signal may be so selected as to correspond to the reference position of each of the engine cylinders.

By providing the low or "L" interval (constant level signal interval or duration) in the first signal series with the reference position for the specific cylinder group being set at the time point at which generation of the succeeding angular signal is started (at a termination of the "L" level interval), the reference positions for the cylinders can be obtained with high accuracy notwithstanding of simplified hardware structure.

In still another preferred mode for carrying out the invention, the constant level signal may be generated in correspondence to each of the individual cylinders of the engine.

By using the angular position signal generated in succession to the pulse edge of the cylinder identifying signal for identifying the reference positions of the individual engine cylinders, it is possible to derive rapidly the reference position with simplified structure.

In a further preferred mode for carrying out the invention, the cylinder identifying signal may contain a pulse for identifying the given one cylinder, wherein this pulse has a pulse width differing from those of the other pulses for identifying the other engine cylinders.

By setting the pulse width of the cylinder identifying signal for the given or specific engine cylinder so as to be different from those for the other cylinders, the engine cylinder identification can easily be accomplished.

In a yet further preferred mode for carrying out the invention, the cylinder identifying signal may contain an additional pulse generated within a predetermined angle relative to the cylinder identifying signal pulse for identifying the given one engine cylinder.

By generating the additional pulse in the vicinity of the cylinder identifying signal pulse for identifying the specific or given one cylinder, the cylinder identification can be carried out easily and rapidly.

In a still further preferred mode for carrying out the invention, the cylinder identifying means may be so implemented as to measure a time interval during which the cylinder identifying signal is generated on the basis of a count value of the angular position signal pulse, to thereby identify discriminatively the individual engine cylinders from one another on the basis of the results of the measurement.

By measuring the duration of the interval during which the cylinder identifying signal is generated by counting the angular position signal pulses, as mentioned above, the cylinder identification can be realized with high reliability.

In a further preferred mode for carrying out the invention, the cylinder identifying means may be so arranged as to identify the individual engine cylinders on the basis of ratios of time intervals during which the cylinder identifying signals are generated, respectively.

By arithmetically determining the duty ratio of the cylinder identifying signal pulse, as mentioned above, the cylinder identification can be realized with high accuracy even when the first signal series can not be obtained, whereby the backup control can be realized with high accuracy and reliability.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Now, the present invention will be described in detail in conjunction with what is presently considered as preferred or typical embodiments thereof by reference to the drawings. In the following description, like reference characters designate like or corresponding parts throughout the several views.

Embodiment 1

Figure 1:
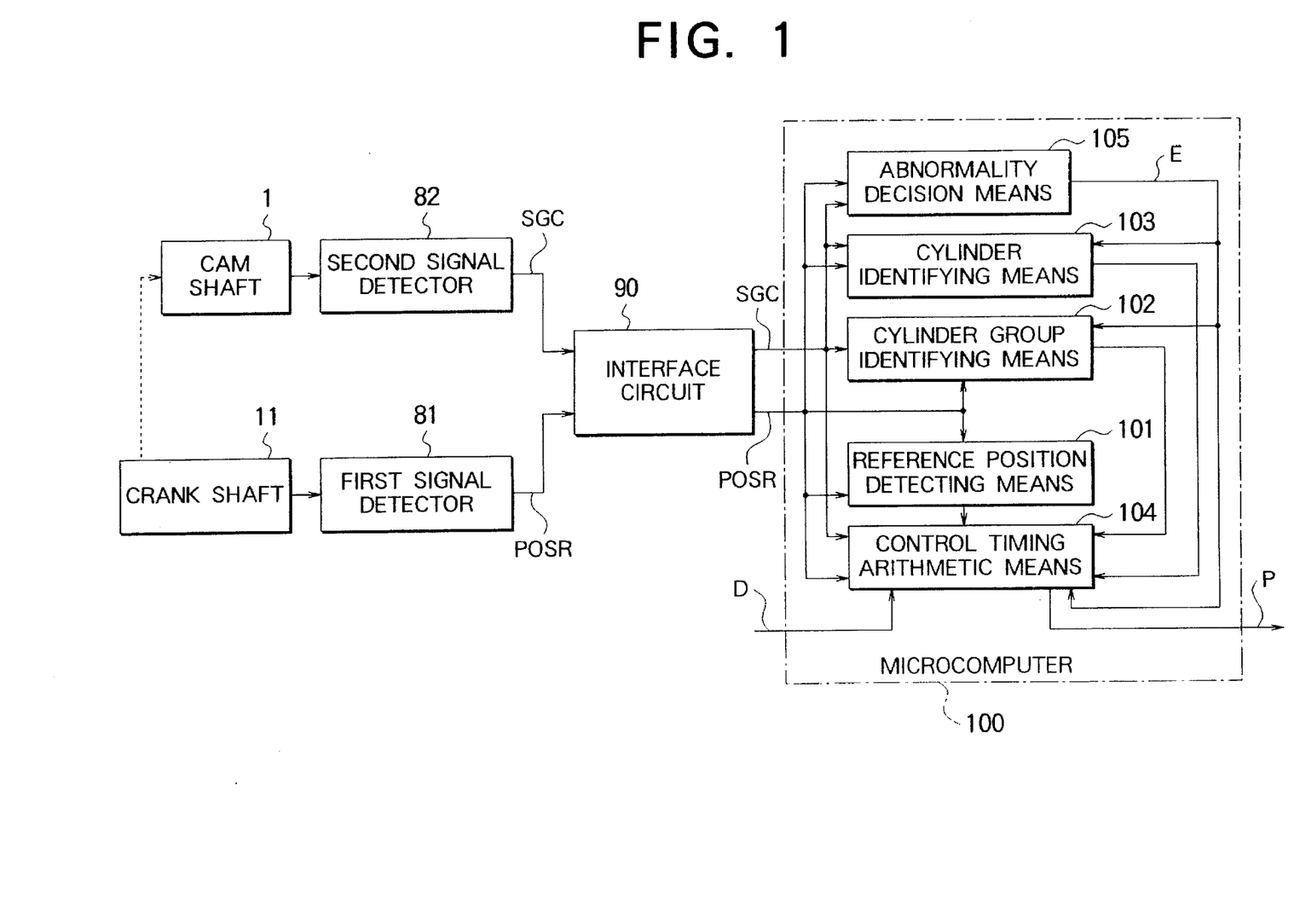
FIG. 1 is a functional block diagram showing schematically a general arrangement of an engine control apparatus according to a first embodiment of the invention.
Figure 2:
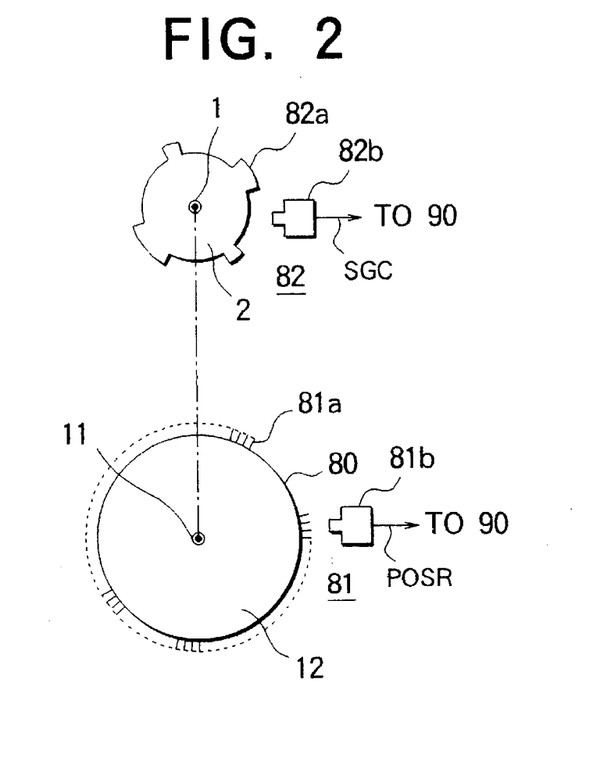
FIG. 2 is a view showing schematically structures of first and second signal detectors employed in the engine control apparatus according to the first embodiment of the invention.
Figure 3:
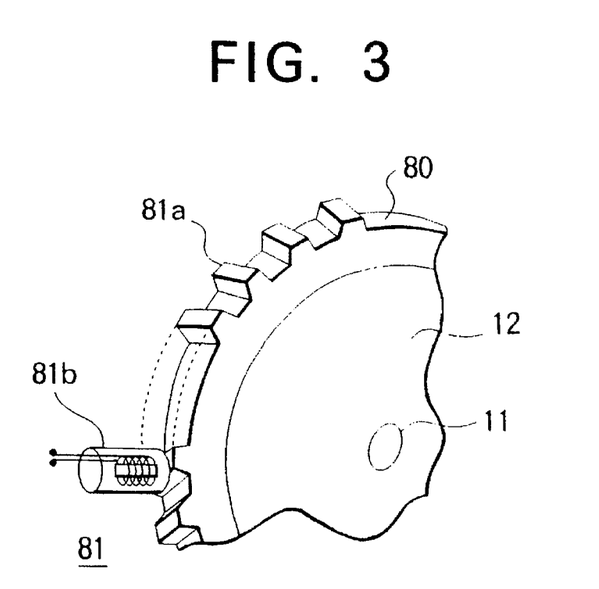
FIG. 3 is a fragmental perspective view showing exaggeratedly the first signal detector shown in FIG. 2.
Figure 4:
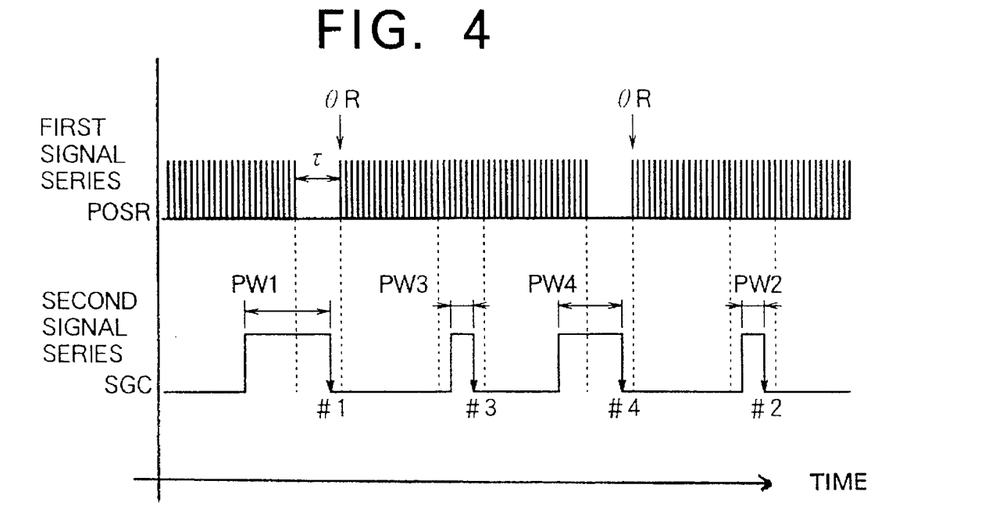
FIG. 4 is a waveform diagram for illustrating, by way of an example, operation of the engine control apparatus according to the first embodiment of the present invention.

At first embodiment of the engine control apparatus according to the invention will be described by reference to FIGS. 1 to 4, wherein FIG. 1 is a functional block diagram showing schematically a general arrangement of the engine control apparatus according to the first embodiment of the invention, FIG. 2 is a view showing schematically structures of signal detectors employed in the engine control system shown in FIG. 1, FIG. 3 is a fragmental perspective view showing exaggeratedly a first signal detector, and FIG. 4 is a waveform diagram for illustrating first and second signal series generated in the engine control apparatus according to the first embodiment of the invention.

Referring to the Figures and in particular to FIG. 2, a cam shaft 1 is rotated in synchronism with a crank shaft 11 of an internal combustion engine by way of a transmission mechanism such as a belt drive mechanism or the like with a speed reduction ratio of "½" relative to the crank shaft 11.

A first signal detector generally denoted by 81 is designed to output a first signal series POSR which is associated with the rotation of the crank shaft 11. More particularly, referring to FIGS. 2 and 3, the first signal detector 81 is comprised of a rotating disk 12 mounted integrally on the crank shaft 11 for corotarion therewith, a plurality of projections (or teeth) 81a formed in the rotating disk 12 around an outer peripheral edge thereof with a predetermined angular distance or pitch (e.g. for every crank angle ranging from 1° to 10°) and a sensor 81b which may be constituted by an electromagnetic pickup device, Hall element, magnetoresistance type sensor device or the like. In the case of the structure shown in FIGS.

2 and 3, it is assumed, only by way of an example, that the sensor 81b is constituted by an electromagnetic pickup device.

Referring to FIG. 4, the first signal series POSR includes angular position signal pulses generated at every predetermined angular position of the crank shaft 11 in synchronism with the rotation thereof and a constant level signal (equivalent to a low level interval τ) generated over a predetermined angular range (e.g. over a crank angle of ten to several ten degrees) indicating a reference position of a particular or specific cylinder group (including the cylinders #1 and #4 which can be controlled simultaneously) of the internal combustion engine.

The angular position signal contained in the first signal series POSR includes a series of pulses which are generated in correspondence to the individual projections 81a formed in succession around the outer peripheral edge of the rotating disk 12, wherein there is provided in the circumferential row of the projections 81a a non-toothed portion or segment 80 in which the projections or teeth 81a are absent over a predetermined angular range in Which the pulses of the angular position signal are not generated, wherein the terminal end of the non-toothed segment 80 (corresponding to the start position of generation of the succeeding pulse train of the angular position signal) corresponds to the reference position θR of the specific cylinder group. Further, it should be noted that the non-toothed segment 80 is provided at only one location of the outer peripheral edge of the rotating disk 12 mounted integrally on the crank shaft 11 so that the non-toothed portion 80 bears correspondence only to the specific cylinder group (i.e., the non-toothed segment 80 makes appearance at every crank angle of 360°, to say in another way).

On the other hand, provided in association with the cam shaft 1 is a second signal detector 82 for generating a second signal series SGC, wherein the second signal detector 82 is constituted by a rotating disk 2 mounted integrally on the cam shaft 1 for corotation therewith, a predetermined number of projections or teeth 82a formed in the rotating disk 2 around the outer peripheral edge in one-to-one correspondence to the engine cylinders, respectively, and a sensor 82b which may be constituted by an electromagnetic pickup device. Parenthetically, it is assumed, only by way of example, that the internal combustion engine now under consideration incorporates four cylinders. Accordingly, the number of the projections 82a is equal to four (refer to FIG. 2).

The second signal series SGC is composed of cylinder identifying signal pulses which are generated in correspondence to the individual engine cylinders, respectively, wherein the pulse corresponding to a specific one of the engine cylinders (the cylinder #1) has a pulse duration or width PW1 which is longer than the pulse widths PW2 to PW4 of the identifying signal pulses for the other cylinders #2 to #4.

The first signal series POSR and the second signal series SGC mentioned above are supplied to a microcomputer 100 by way of an interface circuit 90, as shown in FIG. 1.

The microcomputer 100 constitutes a control means for controlling parameters involved in the operation of the internal combustion engine. To this end, the microcomputer 100 is comprised of a reference position detecting means 101 for detecting a reference position θR for the specific cylinder group from the angular position signal contained in the first signal series POSR and generated in secession to a pulse edge contained in the second signal series SGC (e.g. falling edge indicated by an arrow in FIG. 4), a cylinder group identifying means 102 for discriminatively identifying a cylinder group on the basis of the constant level signal ("L"-level interval τ and the second signal series SGC, a cylinder identifying means 103 for identifying the individual cylinders on the basis of at least the second signal series SGC, a control timing arithmetic means 104 for arithmetically determining or calculating control timings for the engine operation parameter P (such as ignition timing) on the basis of at least the result of the cylinder identification performed by the cylinder identifying means 103 and the second signal series SGC, and an abnormality decision means 105 for outputting an abnormality decision signal E to the cylinder identifying means 103, and the control timing arithmetic means 104 upon detection of occurrence of a failure at least in the first signal series POSR.

So long as the first signal series POSR and the second signal series SGC suffer no fault, the cylinder identifying means 103 incorporated in the microcomputer 100 measures the interval or period during which the cylinder identifying signal pulse contained in the second signal series SGC (e.g. the interval of "H" level) by counting the pulses of the angular position signal contained in the first signal series POSR generated during the above-mentioned interval. The individual engine cylinder can be identified on the basis of the number of first signal series POSR pulses as counted which indicate the durations of the pulses contained in the second signal series SGC.

On the other hand, the control timing arithmetic means 104 is so arranged as to count the angular position signal pulses starting from the reference position θR for the individual engine cylinder, respectively, to thereby arithmetically determine the control parameter.

On the contrary, when the first signal series POSR is unavailable due to occurrence of a failure in the sensor or for any other reason, i.e., when the first signal series POSR continues to remain at a constant level or exhibits and abnormal pulse width, the abnormality decision means 105 generates an abnormality decision signal E for changing-over the control processing, wherein the abnormality decision signal E is inputted to the cylinder group identifying means 102, the cylinder identifying means 103 and the control timing arithmetic means 104. In this case, the abnormality decision means 105 is adapted to make decision as to abnormality of the second signal series SGC.

The cylinder identifying means 103 responds to the abnormality decision signal E issued by the abnormality decision means 105 to thereby discriminatively identify the individual engine cylinders on the basis of the result of the calculation of the ratio of the temporal duration of the cylinder identifying signal pulse (e.g. the duty ratio between the duration of "H" level and "L" level adjacent to each other) by using only the second signal series SGC. In this manner, a backup control can be realized.

On the other hand, the control timing arithmetic means 104 utilizes the falling edge of the cylinder identifying signal pulse as the control timing for the parameter P.

More specifically, when the engine system operates normally, the cylinder identifying means 103 measures the time intervals during which the cylinder identifying signal pulses contained in the second signal series SGC are generated, by counting the angular position signal pulses contained in the first signal series POSR during the corresponding time intervals, respectively, to thereby identify discriminatively the individual engine cylinders on the basis of the results of the measurement, as will be described later on. On the other hand, upon occurrence of abnormality unavailability or absence of the first signal series POSR, the cylinder identifying means 103 responds to the abnormality decision signal E generated by the abnormality decision means 105 to thereby discriminatively identify the individual engine cylinders on the basis of the result of the calculation of the ratio of the temporal duration of the cylinder identifying signal pulse (e.g. the duty ratio between the duration of "H" level and that of "L" level) by using only the second signal series SGC. In this manner, a backup control can be realized.

Similarly, the control timing arithmetic means 104 arithmetically determines or calculates the control timings for the engine operation parameter by counting the angular position signal pulses by making use of the reference position θR indicated by the constant level signal (i.e., "L" level interval τ) contained in the first signal series POSR as well as the cylinder identifying signal contained in the second signal series SGC, so long as the engine operation is normal.

By contrast, upon occurrence of abnormality in the first signal series POSR, the control timing arithmetic means 104 responds to the abnormality decision signal E issued by the abnormality decision means 105 to thereby realize the backup control by relying on only the cylinder identifying signal pulses contained in the second signal series SGC. Furthermore, in the case where the second signal series SGC can not be obtained, the control timing arithmetic means 104 performs the backup control by simultaneously firing the engine cylinders belonging to a same group by making use of only the result of the identification performed by the cylinder group identifying means 102 on the basis of the first signal series POSR.

Parenthetically, so long as the engine operation is normal, the control timing arithmetic means 104 arithmetically determines the control parameters P such as the ignition timing, the fuel injection quantity and others by reference to data stored in the form of a map in a memory (not shown) on the basis of operation state signals D supplied from a variety of sensors (not shown), to thereby control the individual engine cylinders in accordance with the control parameters P as determined.

Next, referring to FIG. 4, description will be made of operation of the engine control apparatus implemented in the structure shown in FIGS. 1 to 3 according to the first embodiment of the present invention.

As mentioned previously, the rotating disk 12 having the projections or teeth 81a formed over every predetermined angle around the outer peripheral edge is mounted on the crank shaft 11 with the sensor 81b being disposed in opposition to the projections 81a to thereby constitute the first signal detector 81 for generating the first signal series POSR which contains the angular position signal pulse corresponding to the projections 81a, respectively, and the constant level signal pulses indicating the reference position θR.

It should be recalled that the row of the projections 81a is partially provided with the non-toothed portion or segment 80 (at one location on the outer peripheral edge of the rotating disk 12 in the case of the four-cylinder engine) so that the first signal series POSR includes not only the angular position signal pulses but also the constant level signal indicating the reference position θR.

The non-toothed segment 80 is detected by the sensor 81b which transforms the presence/absence of the projections or teeth 81a into the first signal series POSR (electric signal) to be inputted to the reference position detecting means 101 incorporated in the microcomputer 100, wherein the non-toothed segment 80 is detected or identified by the reference position detecting means 101 by comparing the intervals at which the angular position signal pulses and the reference position signal pulses are generated, respectively.

Thus, the first signal series POSR (refer to FIG. 4) generated in correspondence to the projections 81a formed in the rotating disk 12 mounted on the crank shaft 11 contains the angular position signals constituted by the pulses generated upon every predetermined angle and the constant level signal corresponding to the interval or period τ of "L" level during which no angular position signal pulse can be obtained over a predetermined angle corresponding to the arcuate length of the non-toothed segment 80.

In that case, it is to be noted that the position at which the interval τ of "L" level generated upon every crank angle of 360° is terminated (i.e., the position at which generation of the succeeding angular position signal is started) represents the reference position θR which is employed in the arithmetic determination of the control timing for the specific cylinder group.

More specifically, the cylinder group identifying means 102 identifies the specific cylinder group and the other cylinder group discriminatively from each other on the basis of only the reference position θR generated by the reference position detecting means 101. Thus, the control timing arithmetic means 104 can speedily identify the group of cylinders which can be fired simultaneously on a group-by-group basis. In this manner, the engine control performance can be ensured at least to a necessary minimum.

On the other hand, the second signal series SGC generated in correspondence to the projections 82a formed in the rotating disk 2 mounted on the cam shaft 1 contains the cylinder identifying signal pulses, wherein the pulse corresponding to a specific cylinder (e.g. the cylinder #1) is so set as to have the pulse width PW1 which is longer than the pulses for the other engine cylinders.

Thus, the cylinder identifying means 103 can identify the specific cylinder and the other cylinders discriminatively, whereby the control timing arithmetic means 104 can realize a desired engine control performance on the basis of the result of the cylinder identification executed by the cylinder identifying means 103.

Of course, so long as the first signal series POSR and the second signal series SGC are obtained without failure, the cylinder identifying means 103 can discriminatively identify the specific engine cylinder as well as the other cylinders by measuring the pulse width of the second signal series SGC while counting the number of the angular position signal pulses contained in the first signal series POSR.

Since the reference position θR for the specific cylinder group coincides with a time point at which restart of generation of the angular position signal is detected in succession to detection of the falling edge of the cylinder identifying signal pulse contained in the second signal series SGC, the reference position θR can speedily be detected within a short time intervening between the falling pulse edge and the restart of the angular position signal.

Further, the reference positions θR for the other cylinder group and the individual engine cylinders can be detected at the time points at which predetermined numbers of the angular position signal pulses are counted, respectively, starting from the reference position θR for the specific cylinder group.

On the other hand, unless the first signal series POSR can be obtained normally due to a failure or defect of the sensor 81b provided in association with the crank shaft 11, the cylinder identifying means 103 effectuates the cylinder identification by using only the second signal series SGC. Thus, the backup control for the engine parameter can be realized.

In more concrete, the cylinder identifying means 103 performs calculation and comparison of the ratios between the "H"-level durations and the "L"-level durations of the pulses contained in the second signal series SGC sequentially to thereby identify the specific engine cylinder on the basis of the pulse having the greatest pulse width PW1 during which the second signal series SGC is at "H" level and then identifying the other cylinders in succession.

In this case, by setting the timings at which the individual pulses of the second signal series SGC fall as the ignition timings for the individual cylinders, there can be ensured the internal combustion engine control performance as desired.

Furthermore, when the second signal series SGC is not available due to a defect of the sensor 82b provided in association with the cam shaft 1, the control timing arithmetic means 104 can perform the backup control by resorting to the groupwise simultaneous firing control on the basis of only the result of the cylinder group identification based on the reference position θR indicated by the constant level signal contained in the first signal series POSR and the counted value of the angular position signal pulses contained in the latter. Thus, the engine control performance as desired can be ensured.

As will now be appreciated, by providing the first signal detector 81 for detecting the first signal series POSR containing the angular position signal and the constant level signal (indicating the reference position θR) in association with the crank shaft 11, there takes place no phase difference due to interposition of the transmission mechanism such as the belt drive mechanism. Thus, the crank angle and the reference position θR can be detected with high accuracy, which in turn means that the ignition timings as well as the fuel injection quantity can be controlled with high accuracy.

Furthermore, owing to the use of the constant level signal and the reference position θR set for the specific cylinder group, the specific cylinder group can be identified upon every detection of the reference position θR, whereby the group of the engine cylinders which can simultaneously be controlled can be detected rapidly and easily. Thus, the ignition timing control and the fuel injection control can be carried out rapidly and properly in particular upon starting of the engine operation.

Additionally, even in the case where the first signal series POSR can not be obtained due to a fault of the first signal detector 81 or for any other reason, the backup function for the engine cylinder identification as well as for the reference position identification can be realized by arithmetically determining the duty cycle of the pulses contained in the second signal series SGC, whereby the ignition timing control and the fuel injection control can continuously be sustained by the backup control without incurring shutdown of the engine.

Embodiment 2

In the case of the engine operation control apparatus according to the first embodiment of the invention described above, the pulse contained in the second signal series SGC and identifying the specific engine cylinder is so set as to have the pulse with PW1 which are different from those of the other cylinders. However, such arrangement may equally be adopted that an additional pulse is generated in addition to a specific cylinder identifying signal pulse in the vicinity thereof within a predetermined angular range.

Figure 5:
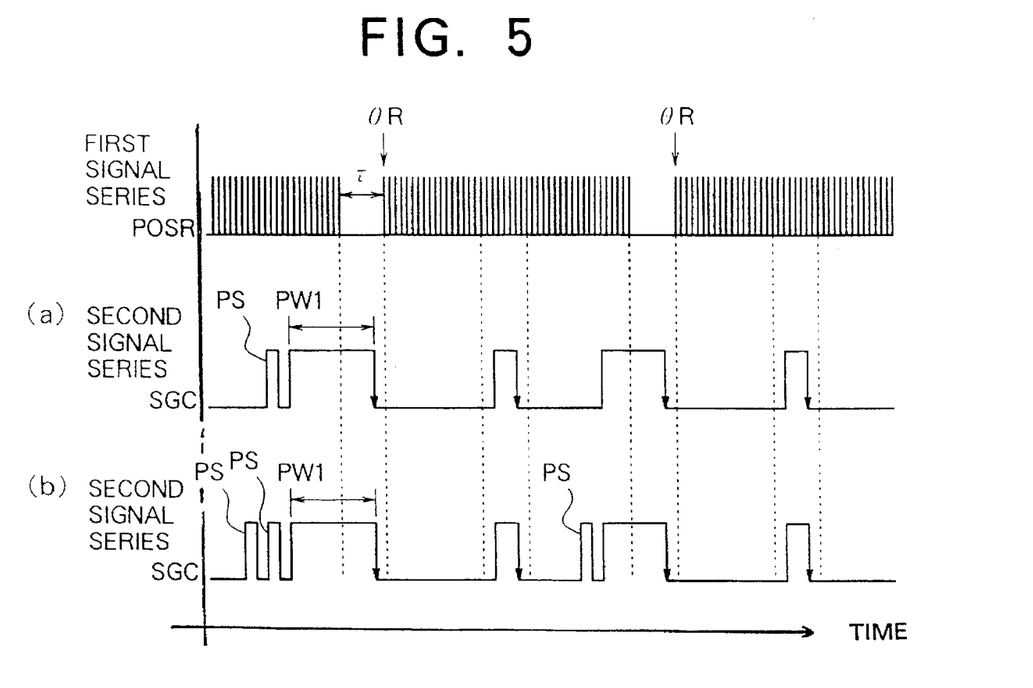
FIG. 5, (a) and (b) are a waveform diagram for illustrating operation of an engine control apparatus according to a second embodiment of the invention.

FIG. 5 is a waveform diagram for illustrating operation of the engine control apparatus according to a second embodiment of the invention in which an additional pulse Ps is generated in the vicinity of the specific engine cylinder identifying signal pulse.

Referring to FIG. 5, there are illustrated at (a) and (b), respectively, waveforms of the second signal series SGC which differ from one another. More specifically, there is illustrated at (a) in FIG. 5 a waveform of the second signal series SGC in which an additional pulse Ps is generated in the vicinity of the specific cylinder identifying signal pulse, while illustrated at (b) is a waveform of the second signal series SGC in which two additional pulses Ps are generated for the specific cylinder (cylinder #1) with one additional pulse being generated for the cylinder (cylinder #4) which belongs to the same group as the specific cylinder (#1).

As is apparent from the waveforms shown in FIG. 5, the specific cylinder can be identified discriminatively from the other cylinders in terms of presence/absence of the additional pulse Ps or the number thereof. Thus, the pulses for identifying the engine cylinders, respectively, may have a same pulse width except for the additional pulse Ps.

Referring to FIG. 5 at (a), the specific engine cylinder can discriminatively be identified by the cylinder identifying means 103 by detecting the additional pulse Ps generated within a predetermined angular range in the vicinity of the intrinsic engine cylinder identifying signal pulse for the specific cylinder.

More specifically, so long as the first signal series POSR and the second signal series SGC are generated normally, it is possible to detect the additional pulse Ps generated within a predetermined angular range relative to the intrinsic engine cylinder identifying signal pulse by counting the angular position signal pulses contained in the first signal series POSR. On the other hand, when the first signal series POSR can not be obtained, existence of the additional pulse Ps within the predetermined angular range can discriminatively be detected through comparison of the duty ratios of the pulses contained in the second signal series SGC.

Furthermore, when the pulse waveform shown in FIG. 5 at (b) is employed, two additional pulses Ps are generated for identifying the specific cylinder (#1) while one additional pulse Ps is added for identifying the cylinder (#4) which belongs to the same cylinder group as the specific cylinder (#1). Thus, the specific cylinder (#1) as well as the counter part cylinder (#4) belonging to the same cylinder group can straightforwardly be identified, respectively, in terms of the number of the additional pulses Ps.

Parenthetically, the number of the additional pulses Ps can be selected rather arbitrarily.

At this juncture, it should be mentioned that when the first signal series POSR can not be obtained in the case where the pulse waveform shown at (a) or (b) in FIG. 5 is used, it is possible to identify the individual engine cylinders by determining the number of the additional pulses Ps through the arithmetic determination of the duty ratios of the pulses contained in the second signal series SGC through a similar procedure as described hereinbefore.

In this way, the control timing arithmetic means 104 can perform in continuation the desired backup control by utilizing as the control timings the falling time points of the pulses (or pulse groups including the additional pulse Ps) contained in the second signal series SGC (the falling time points mentioned above coincide with one another for the individual engine cylinders, respectively, as indicated by arrows in FIG. 5).

Embodiment 3

In the case of the preceding embodiments, the first signal detector 81 is provided in association with the crank shaft 11 while the second signal detector 82 is provided in association with the cam shaft 1. However, so far as the reference position detecting accuracy as required is not severe, the dispositions of the signal detectors 81 and 82 may be reversed so that the first signal series POSR indicating the reference position θR is generated in association with the cam shaft 1.

Embodiment 4

In the case of the preceding embodiments, the constant level signal indicating the reference position θR is generated in correspondence to the non-toothed segment formed in the rotating disk 12 along the outer peripheral edge thereof so that the "L" level interval τ takes place in the first signal series POSR within the angular range corresponding to the non-toothed segment 80. However, the constant level signal is not restricted to the "L" level signal but other signal form may be employed substantially to the same effect so long as the signal exhibiting a same constant level in continuation over a predetermined angular range. By way of example, a segment having an enlarged radius (e.g. having a top surface corresponding to the tip of the projection 81a) may be formed in the rotating disk 12 at the location corresponding to the non-toothed segment 80. In that case, the constant level signal will be represented by a high or "H" level interval.

Embodiment 5

In the case of the preceding embodiments, the cylinder identifying signal pulse contained in the second signal series SGC is so generated that the falling edge thereof is positioned within the "L" level interval τ of the constant level signal contained in the first signal series POSR. However, the cylinder identifying signal pulse may be so generated that the rising edge thereof occurs during the "L" level interval.

Figure 6:
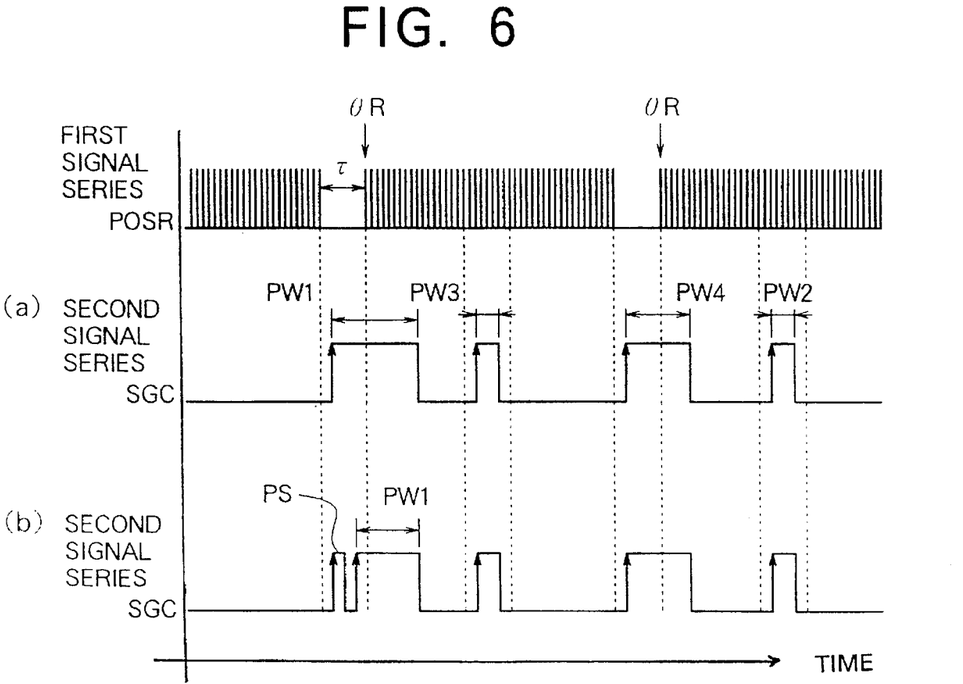
FIG. 6, (a) and (b) are a waveform diagram for illustrating operation of an engine control apparatus according to a fifth embodiment of the invention.

FIG. 6 is a waveform diagram illustrating operation of the engine control apparatus according to a fifth embodiment of the present invention in which the cylinder identifying signal pulse has a rising edge which makes appearance during the "L" level interval.

Referring to FIG. 6, there are illustrated at (a) and (b) respectively, waveforms of the second signal series SGC which differ from one another. More specifically, there is illustrated at (a) in FIG. 6 a waveform in which the cylinder identifying signal pulse width PW1 is set larger than the pulse widths PW2 to PW4 for the other cylinders while illustrated at (b) is a waveform of the second signal series SGC in which one additional pulse is generated for the specific cylinder (cylinder #1).

With the waveforms of the second signal series SGC, the reference position detecting means 101 regards the reference position θR as the time point at which restarting of generation of the angular position signal is detected in succession to detection of the rise-up edge of the cylinder identifying signal pulse. On the other hand, the cylinder identifying means 103 can identify the specific cylinder by detecting the cylinder identifying signal pulse having a large pulse width PW1 or the additional pulse Ps.

Embodiment 6

In the case of the preceding embodiments, the constant level signal contained in the first signal series POSR is generated in correspondence to only the specific cylinder group. However, the constant level signal may be generated for the individual engine cylinders, respectively.

Figure 7:
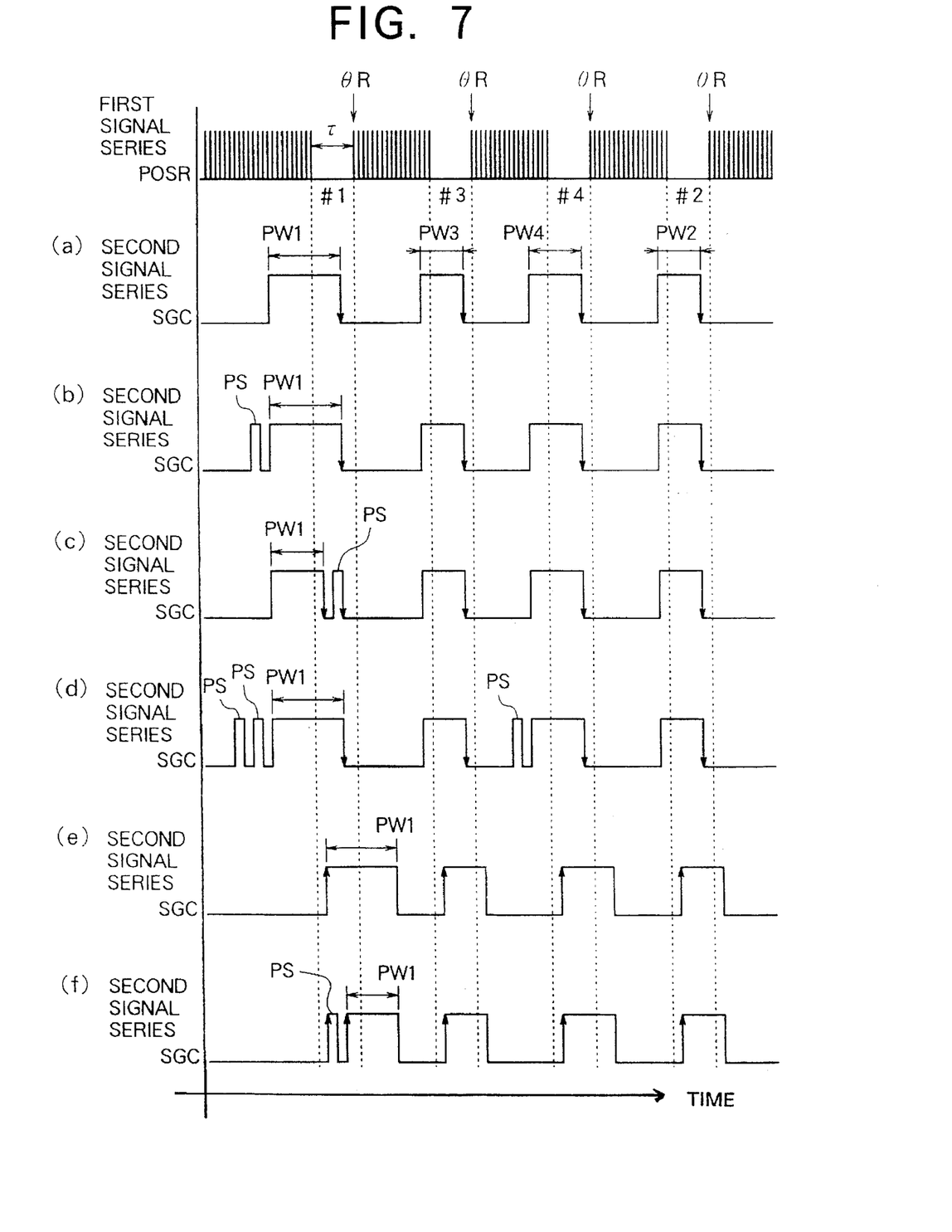
FIG. 7, (a)–(f) are a waveform diagram for illustrating operation of an engine control apparatus according to a sixth embodiment of the invention.

FIG. 7 is a waveform diagram for illustrating operation of the engine control apparatus according to a sixth embodiment of the present invention in which the constant level signal ("L" level interval τ) is generated in correspondence to each of the engine cylinders.

In FIG. 7, it is assumed that the first signal series POSR is generated at every crank angle of 180° in correspondence to the individual cylinders #1 to #4, respectively.

Referring to FIG. 7, there are illustrated at (a) to (f) various waveforms of the second signal series SGC. More specifically, illustrated at (a) is a waveform of the second signal series SGC in which the pulse width PW1 for a specific cylinder is set greater than the pulse widths PW2 to PW4 for the other cylinders, while illustrated at (b) is a waveform of the second signal series SGC in which an additional pulse Ps is inserted immediately before the pulse for identifying the specific cylinder. Further, shown at (c) in FIG. 7 is a waveform of the second signal series SGC in which the additional pulse is generated, following immediately the specific cylinder identifying pulse, while shown at (d) is waveform of the second signal series SGC in which two additional pulses are inserted immediately before the specific cylinder identifying pulse with one additional pulse being inserted immediately after the pulse identifying the cylinder (#4) belonging to the same cylinder group as the specific cylinder. Furthermore, there is shown at (e) in FIG. 7 is a waveform of the second signal series SGC in which the specific cylinder identifying pulse width PW1 is set longer than the other pulses with the rising edge thereof being generated within the "L" level interval τ. Finally, shown at (f) is a waveform of the second signal series SGC in which an additional pulse is inserted in precedence to the specific cylinder identifying with the rising edge being generated within the "L" level interval.

According to the instant embodiment of the invention, there are provided a pair of non-toothed portions or segments 80 on the outer peripheral edge of the rotating disk 12 at diametrically opposite positions (i.e., with angular distance of 180°) for generating the "L" level interval τ for each of the engine cylinders in the first signal series POSR.

Further, in the second signal series SGC, the pulse widths PW2 and PW3 for identifying the other cylinders than the specific one are set longer than those in the preceding embodiments so that parts of these pulse widths PW2 and PW3 can be measured by counting the angular position signal pulses.

By combining the first signal series POSR and one of the second signal series SGC shown in FIG. 7, the individual engine cylinders and the reference position θR can discriminatively identified in the same manner as described hereinbefore.

Namely, the reference position detecting means 101 recognizes as the reference position θR the time point at which generation of the angular position signal is restarted, following immediately detection of the pulse edge of the cylinder identifying signal, while the cylinder identifying means 103 can identify the specific cylinder as well as the other cylinders on the basis of difference in the pulse width between the cylinder identifying signal or presence/absence of the additional pulse.

Further, in case the first signal series POSR suffers a fault, the cylinder identifying means 103 responds to the abnormality decision signal E to thereby identify the specific cylinder and the other cylinders discriminatively on the basis of the duty ratios of the second signal series SGC, while the control timing arithmetic means 104 performs the backup control by regarding the reference position θR as the time point at which the cylinder identifying signal pulses fall.

On the other hand, when abnormality occurs in the second signal series SGC, the backup control is rendered impossible because the engine cylinder identification can not be performed on the basis of only the first signal series POSR.

However, so long as both the first signal series POSR and the second signal series SGC are normal, the reference position θR for each of the individual cylinders can be detected rapidly because there is no need for determining the reference positions θR for the other cylinders on the basis of the respective counted value of the angular position signal pulses.

Many modifications and variations of the present invention are possible in the light of the above techniques. It is therefore to be understood that within the scope of the appended claims, the invention may be practiced otherwise than as specifically described.

What is claimed is:

1. An apparatus for controlling an internal combustion engine, comprising:

a first signal detector for generating a first signal series in synchronism with rotation of a rotating shaft of said internal combustion engine;

a second signal detector for generating a second signal series in synchronism with rotation of said rotating shaft; and control means for controlling a parameter involved in operation of said internal combustion engine on the basis of said first and second signal series;

said first signal series including an angular position signal generated at every predetermined angular position of said rotating shaft and a constant level signal generated over a predetermined angular range and indicating a reference position corresponding to at least a specific cylinder group of said engine;

said second signal series formed by pulses corresponding to said cylinders, respectively, and containing a cylinder identifying signal for a given one of said cylinders, wherein a pulse form of said cylinder identifying signal for said given one cylinder differs from those for the other engine cylinders;

said cylinder identifying signal having a pulse edge generated at a timing falling within an interval of said constant level signal;

said control means including:

reference position detecting means for detecting said reference position on the basis of said angular position signal contained in said first signal series and generated in succession to a pulse edge contained in said second signal series;

cylinder group identifying means for identifying said cylinder group on the basis of said constant level signal and said second signal series;

cylinder identifying means for discriminatively identifying each of said engine cylinders on the basis of at least said second signal series;

control timing arithmetic means for arithmetically determining control timings for controlling said parameter on the basis of at least the results of the cylinder identification performed by said cylinder identifying means and said second signal series; and abnormality decision means for generating and supplying an abnormality decision signal to said cylinder identifying means and said control timing arithmetic means upon detection of a fault in said first signal series.

2. A control apparatus for an internal combustion engine according to claim 1, wherein said first signal series is generated in synchronism with a crank shaft of said internal combustion engine, while said second signal series is generated in synchronism with a cam shaft driven with a speed reduction ratio of "½" relative to said crank shaft.

3. A control apparatus for an internal combustion engine according to claim 1, wherein said control timing arithmetic means is so arranged as to arithmetically determine the control timings for said parameter by counting pulses of said angular position signal.

4. A control apparatus for an internal combustion engine according to claim 1, wherein said constant level signal corresponds to a low level interval during which said angular position signal is not generated continuously, and wherein a time point at which said low level interval is terminated corresponds to the reference position of said specific cylinder group.

5. A control apparatus for an internal combustion engine according to claim 1, wherein said constant level signal is generated in correspondence to each of the individual cylinders of said engine.

6. A control apparatus for an internal combustion engine according to claim 1, wherein said cylinder identifying signal contains a pulse for identifying said given one cylinder, said pulse having a pulse width differing from those of the other pulses for identifying the other cylinders.

7. A control apparatus for an internal combustion engine according to claim 1, wherein said cylinder identifying signal contains an additional pulse generated within a predetermined angle relative to said cylinder identifying signal pulse for identifying said given one cylinder.

8. A control apparatus for an internal combustion engine according to claim 1, wherein said cylinder identifying means is so implemented as to measure a time interval during which said cylinder identifying signal is generated on the basis of a count value of said angular position signal pulse, to thereby identify discriminatively the individual engine cylinders from one another on the basis of the results of said measurement.

9. A control apparatus for an internal combustion engine according to claim 1, wherein said cylinder identifying means is so implemented as to identify the individual engine cylinders on the basis of ratios of time intervals during which said cylinder identifying signals are generated, respectively.

10. A control apparatus for an internal combustion engine according to claim 1, wherein said first signal detector is provided in association with a crank shaft of said engine while said second signal detector is provided in association with a cam shaft which is rotated at a speed (rpm) corresponding to a half of that of said crank shaft, said first detector including a first rotating disk mounted on said crank shaft corotatably therewith and formed with a series of teeth and a non-toothed segment around an outer peripheral edge thereof; and sensor means for detecting said teeth and said non-toothed segment for generating pulses forming said angular position signal and said constant level signal, respectively; and wherein said second signal detector includes a second rotating disk mounted on said cam shaft and formed with projections and second sensor means for detecting said projections to thereby generate pulses constituting said cylinder identifying signal, wherein one of said projections has a greater width than other projections for generating a pulse capable of identifying said given one cylinder.

11. A control apparatus for an internal combustion engine according to claim 10, wherein said first rotating disk is formed with a pair of non-toothed segments at diametrically opposite positions so as to identify the individual cylinders, respectively, in cooperation with said cylinder identifying signal.

12. A control apparatus for an internal combustion engine according to claim 10, wherein height of said toothed segment is lower than that of said teeth.

13. A control apparatus for an internal combustion engine according to claim 10, wherein height of said non-toothed segment is equal to that of said teeth.

* * * * *